(12) United States Patent
Ishioka

(10) Patent No.: US 8,468,917 B2
(45) Date of Patent: Jun. 25, 2013

(54) MACHINE TOOL AND BORING METHOD

(75) Inventor: Katsuhisa Ishioka, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 351 days.

(21) Appl. No.: 12/887,627

(22) Filed: Sep. 22, 2010

(65) Prior Publication Data
US 2011/0079121 A1 Apr. 7, 2011

(51) Int. Cl.
B23Q 3/00 (2006.01)
B23Q 3/04 (2006.01)

(52) U.S. Cl.
USPC .............................. 82/1.11; 82/117; 29/27 C

(58) Field of Classification Search
USPC .................. 82/1.11, 117, 120, 121, 158, 159, 82/161; 29/27 C; 409/165
See application file for complete search history.

(56) References Cited

U.S. PATENT DOCUMENTS

| 2,676,501 | A | * | 4/1954 | North | 408/188 |
| 3,256,755 | A | * | 6/1966 | Kraus | 82/1.4 |
| 7,117,773 | B2 | * | 10/2006 | Katoh et al. | 82/121 |
| 7,240,411 | B2 | * | 7/2007 | Matsumoto et al. | 29/27 C |
| 7,240,412 | B2 | * | 7/2007 | Sasazawa et al. | 29/27 C |
| 7,266,871 | B2 | * | 9/2007 | Takeuchi et al. | 29/27 C |
| 8,297,158 | B2 | * | 10/2012 | Watanabe et al. | 82/121 |

FOREIGN PATENT DOCUMENTS

JP  09-253902 A1  9/1997

* cited by examiner

Primary Examiner — Will Fridie, Jr.
(74) Attorney, Agent, or Firm — Burr & Brown

(57) ABSTRACT

In a machine tool including a supporting device and a tool rest, a workpiece is supported rotatably around a first axis by the supporting device, and a rotary tool or a boring tool for boring operations to machine an internal surface of the workpiece is coupled, rotatably around a second axis, to a rotary shaft of the tool rest. The tool rest is allowed to be turned around an axis perpendicular to the first axis, and the boring tool includes a tool holder adapted to be coupled to the rotary shaft and a bit which is angled with respect to an axis of the tool holder, whereby a boring operation is performed with the tool rest positioned at a predetermined oblique angle with respect to the first axis.

2 Claims, 2 Drawing Sheets

MACHINE TOOL AND BORING METHOD

CROSS-REFERENCE TO RELATED APPLICATION

This application claims the entire benefit of Japanese Patent Application Number 2009-230827 filed on Oct. 2, 2009, the entirety of which is incorporated by reference.

FIELD OF THE INVENTION

The present invention relates to a machine tool which can be used to perform a boring operation on a workpiece, and a boring method adopted in such a machine tool.

BACKGROUND OF THE INVENTION

In a machine tool including a tool rest which has a rotary shaft and is configured to allow a rotary tool such as an end mill to be coupled to the rotary shaft, a boring tool for boring operations may be coupled to the rotary shaft of the tool rest to machine internal surfaces of a workpiece. In this machining (boring) operation, the workpiece is typically placed with its one end supported at a headstock and its another end supported at a tailstock (or a second headstock with a sub-spindle) while the tool rest is disposed between the headstock and the tailstock (see, for example, JP 9-253902 A). The tool rest is retained in a position such that an axis of the rotary shaft of the tool rest is parallel to an axis of the main spindle of the headstock about which the workpiece supported on the main spindle is to be rotated.

When a boring operation is performed, as shown in FIG. 2, with a lathe 31 having a construction similar to that of the machine tool as described above, first, a tailstock 36 is moved away from the headstock 34, and a tool 32 for boring operations is installed in a headstock 33. It is to be noted that, when the tool 32 is installed, relevant parts of the lathe 31 are arranged such that the axis L1 of a rotating shank of the tool 32 is parallel to the axis L2 of the rotary shaft of the tool rest 33 and the axis L2 of the rotary shaft of the tool rest 33 (i.e., the axis L1 of the shank of the tool 32) is parallel to an axis C of rotation of a workpiece W (i.e., an axis of the main spindle of the headstock 34 around which the workpiece W supported on the main spindle is to be rotated). Thereafter, the tool rest 33 or the headstock 34 is moved in a direction of these axes of rotation for machining. A chuck 35 provided at the headstock 34 is configured to hold the workpiece W and rotate around the axis of the main spindle.

However, the conventional machine tool (lathe 31) as described above should be configured to allow the tailstock 36 to move a very long distance because the tailstock 36 should be moved away from the headstock 34 over the total distance of the length of the workpiece W plus the lengths of the tool 32 and the tool rest 33. This would require a large footprint of the machine tool, and entail its undesirable upsizing. Moreover, depending upon the shape of a workpiece W to be worked and the type of a tool 32 to be used, the tailstock 36 would necessarily be moved farther away from the headstock 34 so as to prevent the tool rest 33 from interfering with the tailstock 36, as the case may be. Thus, there is a need for improvement.

It would be desirable to provide a machine tool and a boring method in which interference of a tool rest with a supporting device provided in the machine tool to support a workpiece can be prevented and miniaturization of the machine tool can be achieved. The present invention has been made in an attempt to eliminate the above disadvantages, and illustrative, non-limiting embodiments of the present invention overcome the above disadvantages and other disadvantages not described above.

SUMMARY OF THE INVENTION

In one aspect of the present invention, a machine tool is provided which comprises a supporting device configured to support a workpiece in a manner that permits the workpiece to be rotated around a first axis; and a tool rest having a rotary shaft, the tool rest being configured to allow a rotary tool to be coupled to the rotary shaft in a manner that permits the rotary tool to be rotated around a second axis, the rotary shaft being allowed to be coupled to a boring tool for boring operations to machine an internal surface of the workpiece. The tool rest is allowed to be turned around an axis perpendicular to the first axis, and the boring tool includes a tool holder adapted to be coupled to the rotary shaft and a bit which is angled with respect to an axis of the tool holder, whereby a boring operation is performed with the tool rest positioned at a predetermined oblique angle with respect to the first axis.

In another aspect of the present invention, a method for performing a boring operation on a workpiece is provided which comprises the steps of: providing a machine tool which includes a supporting device configured to support a workpiece in a manner that permits the workpiece to be rotated around a first axis, and a tool rest having a rotary shaft, the tool rest being configured to allow a rotary tool to be coupled to the rotary shaft in a manner that permits the rotary tool to be rotated around a second axis, wherein the tool rest is allowed to be turned around an axis perpendicular to the first axis; coupling, to the rotary shaft of the tool rest, a boring tool for boring operations to machine an internal surface of the workpiece, the boring tool including a tool holder adapted to be coupled to the rotary shaft and a bit which is angled with respect to an axis of the tool holder; turning the tool rest around the axis perpendicular to the first axis and positioning the same at a predetermined oblique angle with respect to the first axis; and performing the boring operation with the tool rest positioned at the predetermined oblique angle with respect to the first axis, by driving the supporting device by which the workpiece is supported and/or the tool rest.

In this method, the step of turning the tool rest may include adjusting the tool rest at an angle such that the bit points in a direction parallel to the first axis.

With the configurations described above, various advantageous effects may be expected as follows.

According to one or more aspects of the present invention as mentioned above, the tool rest can be turned around an axis perpendicular to the first axis about which a workpiece is to be rotated, and a boring operation is performed with the tool rest positioned at a predetermined oblique angle with respect to the first axis, and thus in cases where a pair of supporting devices are provided to support opposite ends of a workpiece, the position of one supporting device that is currently not in use for supporting purposes and away from the workpiece may be set closer to that of the other supporting device that is currently supporting the workpiece in comparison with the conventional machine tool. Therefore, the distance to be traveled by the supporting device being moved away from the other supporting device for installation of a tool or other purposes may be reduced, and thus the machine tool can be designed to be compact in size. Even in cases where only one supporting device is provided, the oblique positioning of the tool rest can serve to avoid interference of the tool rest with walls or other components (e.g., a cover, etc.) of the machine tool, and thus the machine tool can be designed to be compact in size.

If the oblique angle of the tool rest is adjusted appropriately in accordance with the type of the tool and the shape of the workpiece, a desired complicate finish can be achieved on the surface of the workpiece. Moreover, a special type of tool having a greater length in the direction of its rotation axis, which could not be used in the conventional machine tool, can become usable because the tool rest can be turned. In this way, one or more aspects of the present invention as described above may increase the utility of the machine tool. Furthermore, if the tool rest is still likely to interfere with one of the supporting devices which has already been moved away from a workpiece due to the shape, size and/or other properties of the workpiece, the tool rest can be further turned into a better oblique position such that the potential risk of interference with the one of the supporting devices is eliminated without the need to further move the one of the supporting devices away. Accordingly, the miniaturization of the machine tool can be facilitated and the utility of the machine tool can be increased.

In addition, since the bit is angled with respect to an axis of the tool holder, the bit can be delivered deep into a workpiece (that is, it can work a deep hole) while avoiding interference which would otherwise occur between the shank of the bit and the workpiece, even when the tool rest is turned and positioned at a steep oblique angle for machining the internal surfaces of the hole. This advantage may be achieved most effectively when the tool rest is adjusted at an angle such that the bit points in a direction parallel to the first axis.

BRIEF DESCRIPTION OF DRAWINGS

The above aspect, other advantages and further features of the present invention will become more apparent by describing in detail illustrative, non-limiting embodiments thereof with reference to the accompanying drawings, in which.

DETAILED DESCRIPTION OF THE INVENTION

Figure 1:
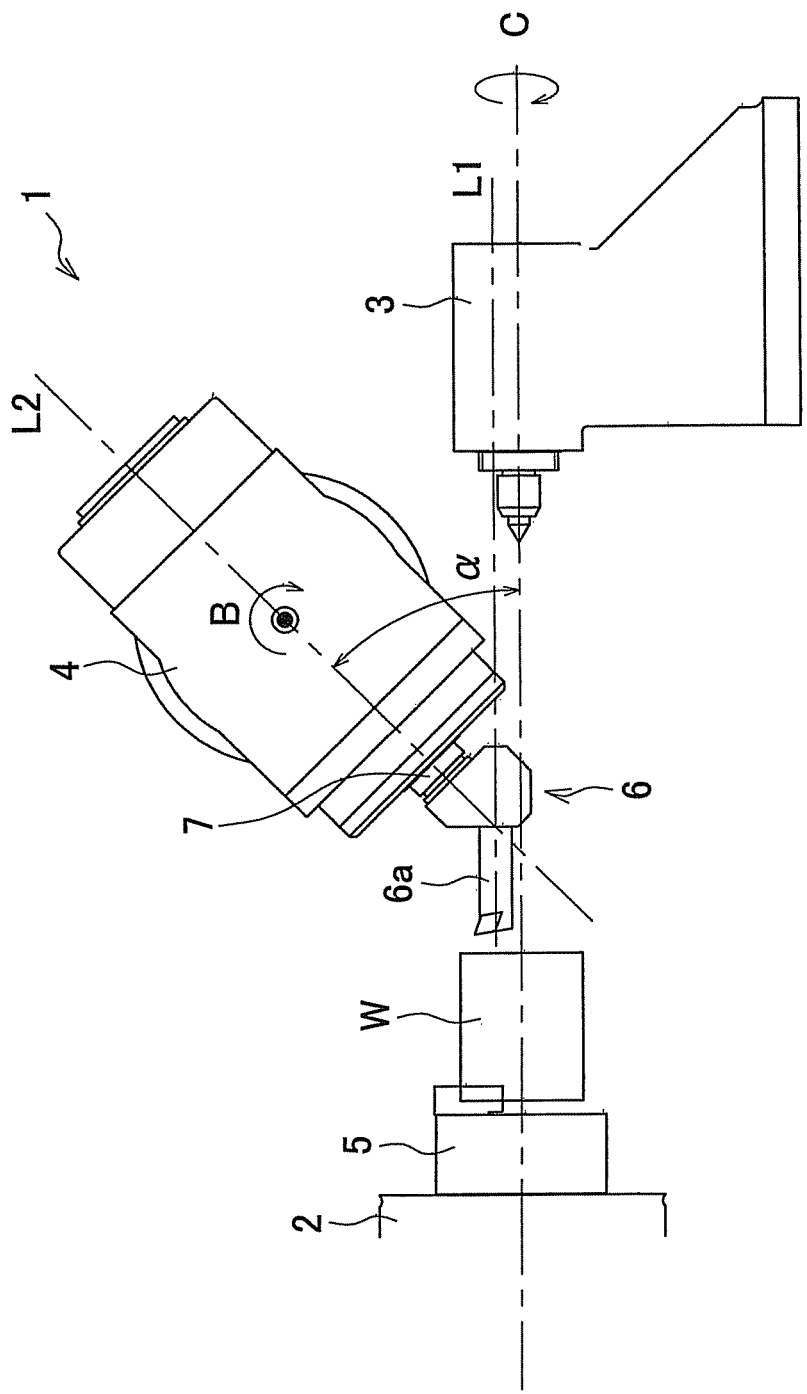
FIG. 1 is a schematic diagram showing a lathe as one example of a machine tool according to one embodiment.
Figure 2:
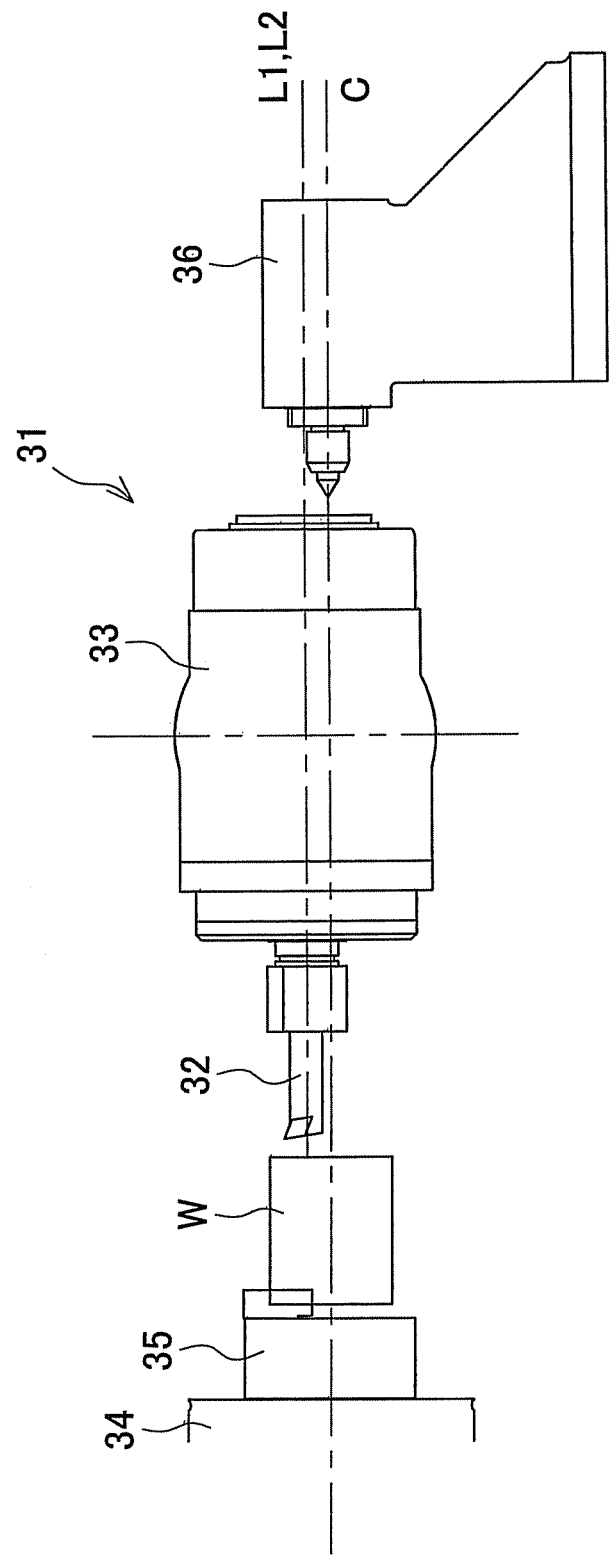
FIG. 2 is a schematic diagram showing a lathe as one example of a conventional machine tool.

A machine tool according to one embodiment of the present invention will be described in detail with reference to the drawings.

A lathe 1 as one example of a machine tool includes a headstock 2 and a tailstock 3 which are opposed to each other, and further includes a tool rest 4 disposed between the headstock 2 and the tailstock 3. A chuck 5 is provided on a surface of the headstock 2 facing to the tailstock 3 and adapted to hold a workpiece W. The chuck 5 is configured to be rotatable around a C-axis that is an axis of a main spindle (parallel to the horizontal in this embodiment). The headstock 2 and the tailstock 3 are configured to be slidable in a direction parallel to the C-axis so that they can be moved by a drive mechanism (not shown) to come nearer to, or go away from, each other.

The tool rest 4 is configured to be turned around a B-axis perpendicular to the C-axis and perpendicular to the vertical, so that the tool rest 4 can be indexed and located to an oblique position such that an axis L2 of a rotary shaft of the tool rest 4 tilts at a specific desired angle with respect to the horizontal plane containing the C-axis. The tool rest 4 has the rotary shaft as in the conventional machine tool, and is configured such that a rotary tool 6 for boring operations to machine an internal surface of a workpiece W can be coupled to the rotary shaft. The rotary tool 6 includes a tool holder 7 adapted to be fitted in the tool rest 4 (coupled to its rotary shaft) and a bit 6a protruding from the tool holder 6a, wherein an axis L1 (extending in a direction of protrusion) of the bit 6a and the axis of the tool holder 7 does not coincide with each other. To be more specific, in the present embodiment, the axis L1 of the bit 6a is angled (at a specific angle α) with respect to the axis of the tool holder 7 (which coincides with the axis L2 of the rotary shaft of the tool rest 4). The tool rest 4, like the headstock 2, is also configured to be slidable in the direction parallel to the C-axis. It is to be understood that various operations of the tool rest 4 as well as the headstock 2 and the tailstock 3 are controlled by a controller (not shown).

The next discussion is directed to a boring operation on a workpiece W performed by the lathe 1.

First of all, the workpiece W is held by the chuck 5 of the headstock 2 and the tailstock 3 is moved away from the headstock 2. Next, the tool 6 is installed in the tool rest 4 and the tool rest 4 is turned around the B-axis until its tilt angle becomes the specific angle α, at which the tool rest 4 is angled to an oblique position such that the axis L1 of the bit 6a is parallel to the axis of the main spindle (i.e., C-axis). Then, the work W is rotated round the C-axis, and the tool rest 4 or the headstock 2 are moved in the direction parallel to the C-axis with the tool rest 4 being kept in that oblique position, whereby a boring operation is performed on the workpiece W to machine internal surfaces thereof.

The axis L1 of the bit 6a and the axis of the main spindle (C-axis) do not have to be parallel to each other, if the type of the tool 6, the shape of the workpiece W and/or any other factor do not require it. That is, the tool rest 4 may be indexed and located, for a particular boring operation, into a different oblique position such that the axis L1 of the bit 6a intersects with the C-axis of the main spindle (i.e., the tool rest 4 is angled at a tilt angle different from the aforementioned tilt angle α).

In cases where the workpiece W to be machined has such a shape or a size as to oblige the tool rest 4 to retreat to a position in which the tool rest 4 would possibly interfere with the tailstock 3, the tool rest 4 may be further turned to a direction in which the more it is turned the greater the angle α becomes so that it is positioned at a new angle with respect to the C-axis, while the tool installed in the tool rest 4 is replaced with another tool which can be used in the tool rest 4 positioned at that new angle, whereby the workpiece W can be machined without the need to further move the tailstock 3 back. On the other hand, when the exterior (peripheral surfaces) of the workpiece W is machined, one end of the workpiece W is supported at the headstock 2 and the other end of the workpiece W is supported at the tailstock 3 in such a manner as to be performed in the conventional machining tool, and then the tool rest 4 in which a tool for exterior machining operations is installed is moved toward a peripheral surface of the workpiece W, whereby the peripheral surfaces of the workpiece W are machined while the tool rest 4 and/or the headstock 2 are being moved relative to each other.

As described above, in the lathe 1, the tool rest 4 is allowed to be turned around the B-axis perpendicular to the C-axis and perpendicular to the vertical, so that the to tool rest 4 can be indexed and located in an oblique position such that the axis L2 of the tool rest 4 is tilted at a specific angle with respect to the horizontal plane containing the C-axis. Accordingly, the oblique position of the tool rest 4 makes it possible to perform a machining operation with the tailstock 3 located in a position closer to the headstock 2 than that in the conventional machine tool, with the result that the distance to be traveled by the tailstock 3 which should be sufficiently moved away from the headstock 2 can be minimized, and thus the lathe 1 can be designed to be smaller in size.

Furthermore, the oblique angle of the tool rest 4 can be adjusted appropriately in accordance with the type of the tool 6 and the shape of the workpiece W, and thus a desired complicate finish can be achieved on the surface of the workpiece W. In addition, such a special type of tool having a greater length in the direction of the C-axis, which could not be used in the conventional machine tool, can become usable because the tool rest 4 can be turned. In this way, the utility of the machine tool (lathe 1) can be increased.

Moreover, if the tool rest 4 is likely to interfere with the tailstock 3 due to the shape, size and/or other properties of the workpiece W, the tool rest 4 can be further turned into a better oblique position such that the potential risk of interference with the tailstock 3 is eliminated, and the tool installed in the tool rest 4 can be replaced with a different tool which can be used in the tool rest 4 located in that better oblique position so that the workpiece W can be machined without the need to further move the tailstock 3 back. Accordingly, the miniaturization of the machine tool (lathe 1) can be facilitated and the utility of the machine tool (lathe 1) can be increased.

The machine tool and the boring method consistent with the present invention are not limited to the above-described illustrative embodiment. Modifications and changes may be made on an as needed basis to the setups of the headstock, the tailstock and the tool rest, and the process of control exercised over the processing (machining) without departing from the scope of the present invention as defined in the appended claims.

For example, the present invention is also applicable to a machine tool in which a second headstock with a chuck is provided instead of the tailstock so that both ends of a workpiece are held by the chucks of the two headstocks when peripheral (external) surfaces of the workpiece are machined. In this alternative embodiment, when internal surfaces of a workpiece are to be machined, the workpiece may be supported by the second headstock with the first headstock being back in a retreated position. Besides, the present invention is also applicable to a machine tool in which no tailstock is provided and only one headstock is provided. With this alternative embodiment, as well, interference of the tool rest with components, such as the walls, covers, of the machine tool can be prevented, and miniaturization of the machine tool can be achieved. In the illustrated embodiment, the machine tool is configured to machine both of the external surfaces and the internal surfaces of a workpiece, but the present invention is not limited to this specific configuration. A machine tool configured to machine only the internal surfaces of a workpiece may be configured in accordance with the present invention.

The tool rest may be of a turret-type in which several tools are held by an indexing tool holder (or turret head) so that a specific tool can be selected and set for use by turning the tool holder around an axis different from the B-axis.

In the above-described embodiment, a workpiece is machined by moving one of the headstock and the tool rest relative to the other, but both of the headstock (workpiece supporting device(s)) and the tool rest may be moved to machine a workpiece.

In addition, the axis of the main spindle may not be horizontal and the direction of turning the tool rest may be changed according to the shape of the machine tool, the number and position of supporting devices, etc. as long as the tool rest is positioned at an oblique angle by being turned about an axis perpendicular to the axis of rotation of the workpiece.

The invention claimed is:

1. A machine tool comprising:
  a supporting device configured to support a workpiece in a manner that permits the workpiece to be rotated around a first axis; and
  a tool rest having a rotary shaft, the tool rest being configured to allow a rotary tool to be coupled to the rotary shaft in a manner that permits the rotary tool to be rotated around a second axis, the rotary shaft being adapted to be coupled to a boring tool for boring operations to machine an internal surface of the workpiece;
  wherein the tool rest is adapted to be turned around an axis perpendicular to the first axis;
  wherein the boring tool includes a tool holder adapted to be coupled to the rotary shaft and a bit which is angled with respect to an axis of the tool holder; and
  wherein the tool rest is turned around to be positioned at a specific oblique angle with respect to the first axis, so that a direction of the bit of the boring tool coupled to the rotary shaft of the tool rest is parallel to the first axis, the supporting device and the tool rest being relatively moved;
  whereby a boring operation, where an axis of a bored hole is parallel to the first axis, is performed to the workpiece rotated around the first axis with the tool rest positioned at the specific oblique angle with respect to the first axis.

2. A method for performing a boring operation on a workpiece, comprising the steps of:
  providing a machine tool which includes a supporting device configured to support a workpiece in a manner that permits the workpiece to be rotated around a first axis, and a tool rest having a rotary shaft, the tool rest being configured to allow a rotary tool to be coupled to the rotary shaft in a manner that permits the rotary tool to be rotated around a second axis, the rotary shaft being adapted to be coupled to a boring tool for boring operations to machine an internal surface of the workpiece, the machine tool performing the boring operation on the workpiece while driving at least one of the supporting device and the tool rest by which the work piece is supported, wherein the tool rest is adapted to be turned around an axis perpendicular to the first axis;
  coupling, to the rotary shaft of the tool rest, the boring tool including a tool holder adapted to be coupled to the rotary shaft and a bit which is angled with respect to an axis of the tool holder;
  turning around the tool rest to make a direction of the bit of the boring tool coupled to the rotary shaft of the tool rest parallel to the first axis, and positioning the tool rest at a predetermined oblique angle with respect to the first axis; and
  performing the boring operation, where an axis of a bored hole is parallel to the first axis, to the workpiece rotated around the first axis with the tool rest positioned at the predetermined oblique angle with respect to the first axis, by driving at least the tool rest and the supporting device by which the workpiece is supported.

* * * * *

UNITED STATES PATENT AND TRADEMARK OFFICE
CERTIFICATE OF CORRECTION

PATENT NO. : 8,468,917 B2
APPLICATION NO. : 12/887627
DATED : June 25, 2013
INVENTOR(S) : Katsuhisa Ishioka Page 1 of 1

It is certified that error appears in the above-identified patent and that said Letters Patent is hereby corrected as shown below:

<u>Title Page, Item (30)</u>: add "Foreign Application Priority Data October 2, 2009 (JP) 2009-230827"

Signed and Sealed this
Fifteenth Day of October, 2013

Teresa Stanek Rea
*Deputy Director of the United States Patent and Trademark Office*